B. B. GOLDSMITH.
METHOD OF MAKING RUBBER BANDS.
APPLICATION FILED AUG. 1, 1911.
1,189,936.
Patented July 4, 1916.
2 SHEETS—SHEET 1.
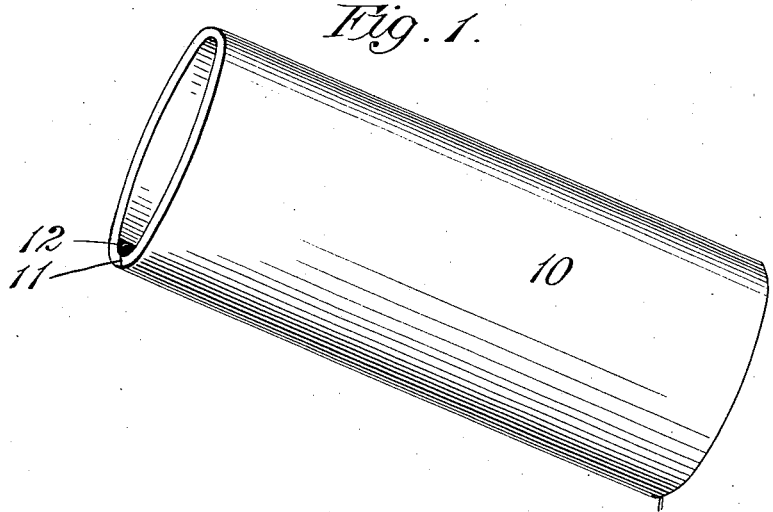
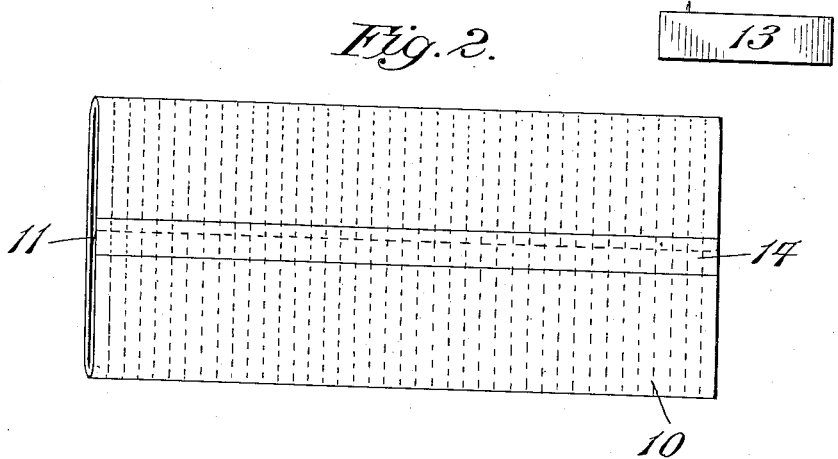
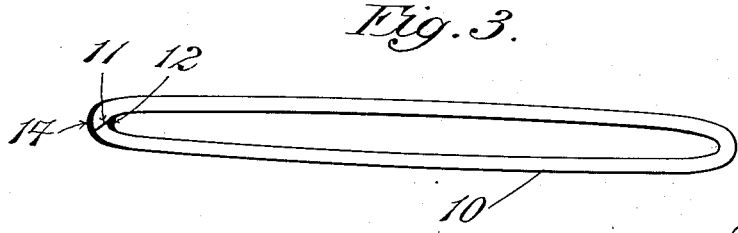
Byron B. Goldsmith
Inventor
Witnesses:
Edward Rowland
A. M. Martin
By his Attorneys
Wilkinson, Fisher, Witherspoon and MacKaye

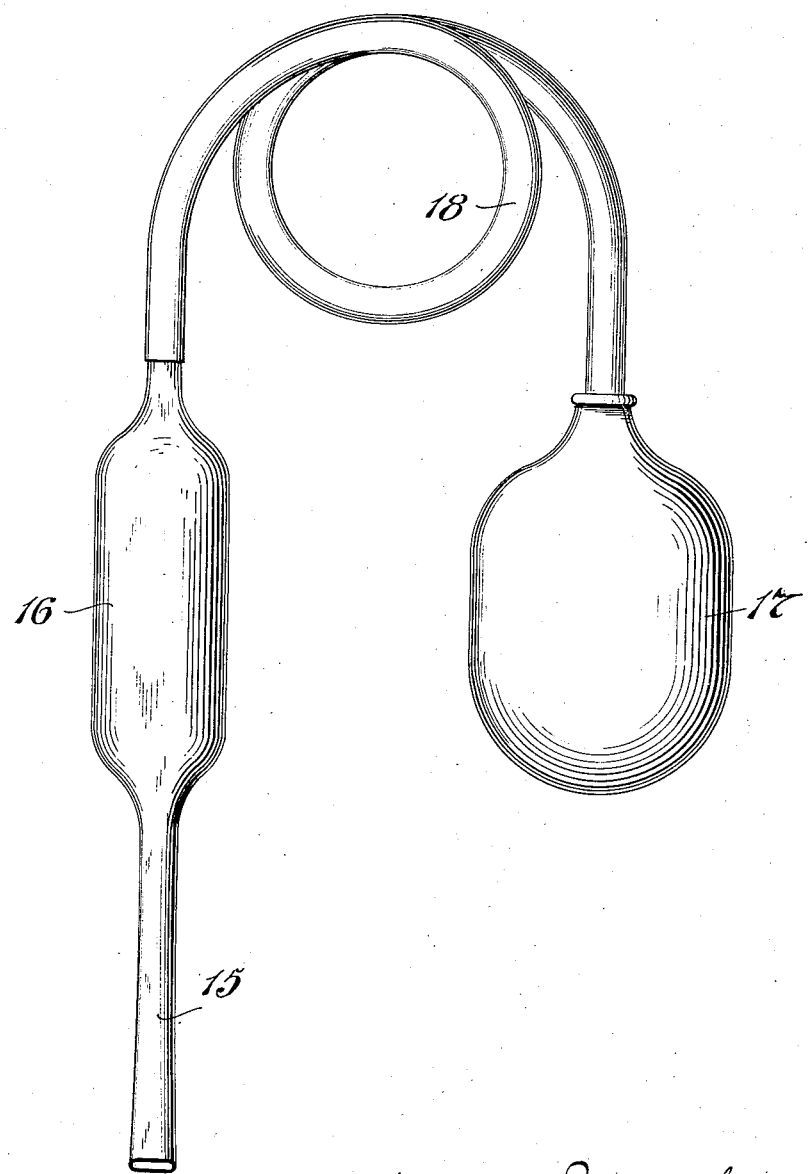

UNITED STATES PATENT OFFICE.

BYRON B. GOLDSMITH, OF NEW YORK N. Y.

METHOD OF MAKING RUBBER BANDS.

1,189,936.   Specification of Letters Patent.   Patented July 4, 1916.

Application filed August 1, 1911. Serial No. 641,857.

*To all whom it may concern:*

Be it known that I, BYRON B. GOLDSMITH, a citizen of the United States, and residing in the borough of Manhattan, in the city of New York and State of New York, have invented certain new and useful Improvements in Methods of Making Rubber Bands; and I do hereby declare the following to be a full, clear, and exact description of the invention, such as will enable others skilled in the art to which it appertains to make and use the same.

In manufacturing rubber bands it has been common heretofore to fold over a long sheet of rubber and cement the edges together, after which the tube so formed is sliced on parallel transverse lines close together, thereby obtaining the narrow rubber bands desired. Great difficulty has been experienced for a long time from the fact that rubber bands made in this manner are weak along the cemented line, and a great many of them on stretching start to open at the joint.

My present invention relates to a method of making an improved form of rubber band which is at least as strong at the point of junction as elsewhere.

The invention is illustrated in the accompanying drawings wherein—

Figure 1 is a perspective view of the rubber tube from which the bands are cut, the same being shown during a certain stage in the improved process, Fig. 2 is a plan view of the same as it appears just before slicing, Fig. 3 is a side view of one of my improved rubber bands, and Fig. 4 is an elevation of a preferred apparatus used for carrying out my process.

In the manufacture of my improved bands I first take a sheet of rubber of suitable size and form a tube therefrom by joining the edges by any well known method. In prior processes for making rubber bands, the tubes thus formed have been vulcanized at this stage and, after vulcanization, have been cut up into the width of band desired. As the bands most in use are not more than one sixteenth of an inch wide, it is necessary in the great majority of cases, that every sixteenth of an inch along the long tube should be perfectly joined. This is practically impossible, and, in consequence, a great many bands are found to be weak at the joint.

My process is to be distinguished from that in which a reinforcing strip of rubber is cemented to the faces of rubber sheets across the meeting edges. Such a process will not answer for rubber bands, as it does not solve the difficulty of insuring a perfect union at every point. On the contrary, where a separate strip is thus applied, it makes the final bands unsightly and actually introduces a greater opportunity for irregular union, since the cement, not being allowed to dry freely in contact with the air, is apt to assume an irregular distribution under the applied strip. By the practice of my improved process this difficulty is absolutely overcome, and any defects caused by the operator in making the joint are corrected, as well as such defects as result from the inherent difficulties of the tube-forming operation. These ends are accomplished by depositing on one or both sides of the seam of the tube, before said tube is vulcanized, a solution containing rubber. This deposit, whether within the tube or outside of it, is made to extend over the abutting edges of the tube-forming sheet for a certain distance on each side of the line of junction. In this manner the seam is entirely obliterated and it is only in bands made in this way that the seams cannot be detected.

The operation is carried out preferably as follows: The tube is first collapsed so as to bring the seam, 11, in the lowermost position and to form a narrow channel immediately above it. It is then held in an inclined position, as shown in Fig. 1, and a stream of a suitable rubber solution 12, is poured down the bottom of the channel so formed, the surplus being caught at 13. This solution, in drying, forms a homogeneous layer against the inside of the seam 11, which is strongly adherent to both sides of the seam. This step of the process having been concluded, the tube 10 is now collapsed so as to bring the seam on the flat side thereof as shown in Fig. 2, and while the tube is in this position, a rubber solution is deposited quickly and evenly over the seam, so that, as it dries, it forms a homogeneous coating 14, which obliterates any defects in the seam and strongly adheres to the outer surface of the tube on both sides of the seam.

While I do not limit myself to the use of any particular apparatus in carrying out this portion of my process, I prefer to employ a means constructed on the principle of the device shown in Fig. 4. Here is shown a tube 15, which may be of glass, having an enlargement 16, and connected to a collapsible vacuum bulb 17 by means of the tube 18. The tip of the tube 15 is preferably flattened so that its greatest width corresponds to the width of the deposit 14 which it is intended to form.

In carrying out my above described process, the tip of the tube 15 is immersed in a suitable rubber solution, the bulb 17 is collapsed and released, and a certain volume of the liquid rises through the tube 15 and enters the enlargement 16. The tip of the tube 15 is then transferred to the seam 11 upon the tube 10 and is drawn along said seam from one end thereof to the other, while, at the same time a proper quantity of solution is exuded from the tube 15 upon the seam by gradually collapsing the bulb 17. When the solution is dry it forms an adherent homogeneous layer, substantially integral with the tube 10.

The importance of using the enlargement 16 in the course of the tube 15 is that there is always a certain degree of vacuum within the bulb 17 and the tube 18, and when the apparatus has been filled to a sufficient height and the tube 15 is withdrawn from the solution, this vacuum still acts, and, if the tube had no enlargement on it, the solution would be drawn back into the rubber tube and also into the bulb, and the tube 15 would be filled with air. The solvent would destroy the rubber tube and the bulb, and great inconvenience would be experienced in using the apparatus on account of the air in the tube 15. The enlargement 16 prevents all this, for as soon as the tube 15 is withdrawn from the solution, the vacuum still remaining in the bulb and rubber tube draws air up into the tube 15 which bubbles through the liquid in the enlargement 16 and destroys the vacuum, so that the solution flows down tube 15 again and the apparatus is ready for use.

The tube 10 having been treated by the successive steps of my process above described, when dry, is vulcanized and then sliced transversely, for instance as indicated in dotted lines in Fig. 2; whereby bands such as shown in Fig. 3 are produced, wherein the seam 11 is coated within and without with homogeneous coatings of rubber 12 and 14, which are substantially integral with the band 10.

Instead of a rubber solution I can use a solvent of rubber alone. This will dissolve a certain amount of the rubber of the tube and will produce the effect desired, although not with the greatest efficiency. In speaking of a solution therefore I am to be understood as referring to such solution whether prepared beforehand or formed in place by depositing a solvent of rubber in the manner above described. It is also to be understood that, where a prepared solution is used, it will be such as will harmonize with the material of which the tube is made, so far as concerns any compounding materials or vulcanizing agents that it may contain.

Various changes may be made in the method and article above described, without departing from the spirit of my invention, and I do not limit myself to the precise details herein shown and described.

What I claim is—

1. The process of manufacturing rubber bands which consists in forming a tube from a sheet of rubber by joining the edges thereof, collapsing and inclining said tube with said joined edges lowermost, pouring down the channel so formed a solution of rubber, permitting the same to dry freely, and then vulcanizing and slicing said tube transversely, substantially as described.

2. The process of manufacturing rubber bands which consists in forming a tube from a sheet of rubber by joining the edges thereof, collapsing and inclining said tube with said joined edges lowermost, pouring down the channel so formed a solution of rubber, permitting the same to dry freely, again collapsing said tube, this time with the joined edges on a flat side, depositing a free layer of rubber in solution across the joined edges on the outer side of the tube so collapsed, allowing said layer to dry freely, and then vulcanizing and slicing said tube transversely, substantially as described.

In testimony whereof, I affix my signature, in presence of two witnesses.

BYRON B. GOLDSMITH.

Witnesses:
 FRANK DREWS,
 FRANK J. MEAZ.